UNITED STATES PATENT OFFICE.

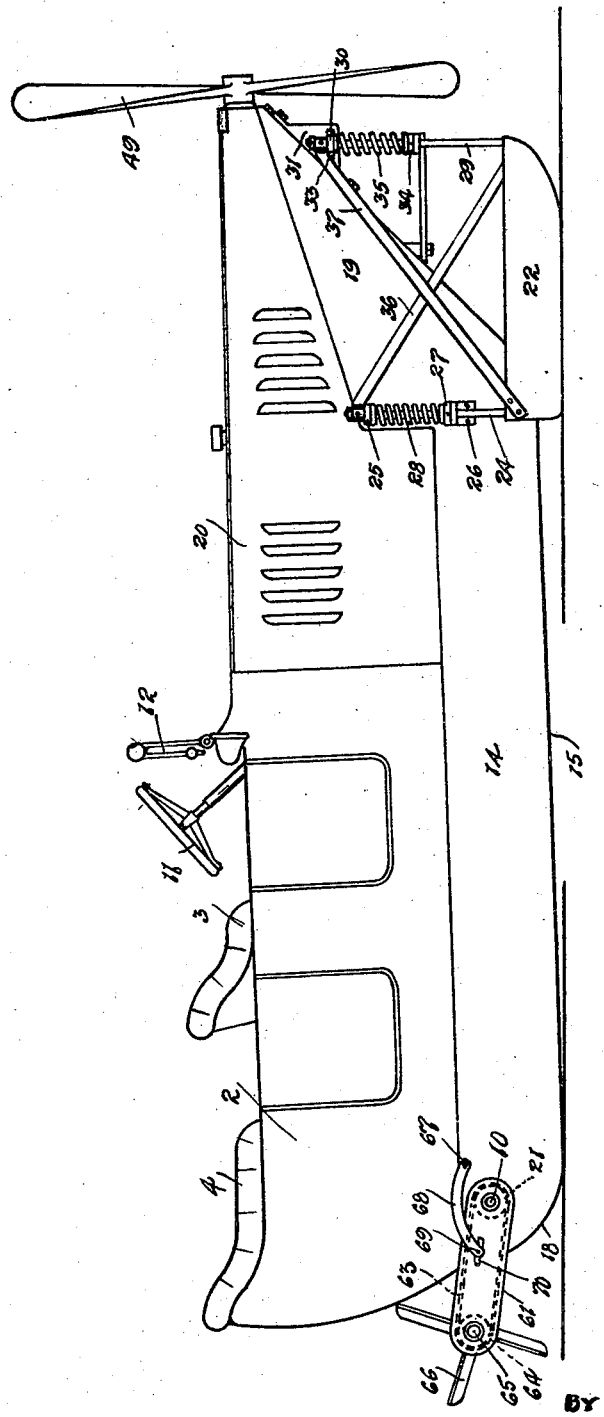

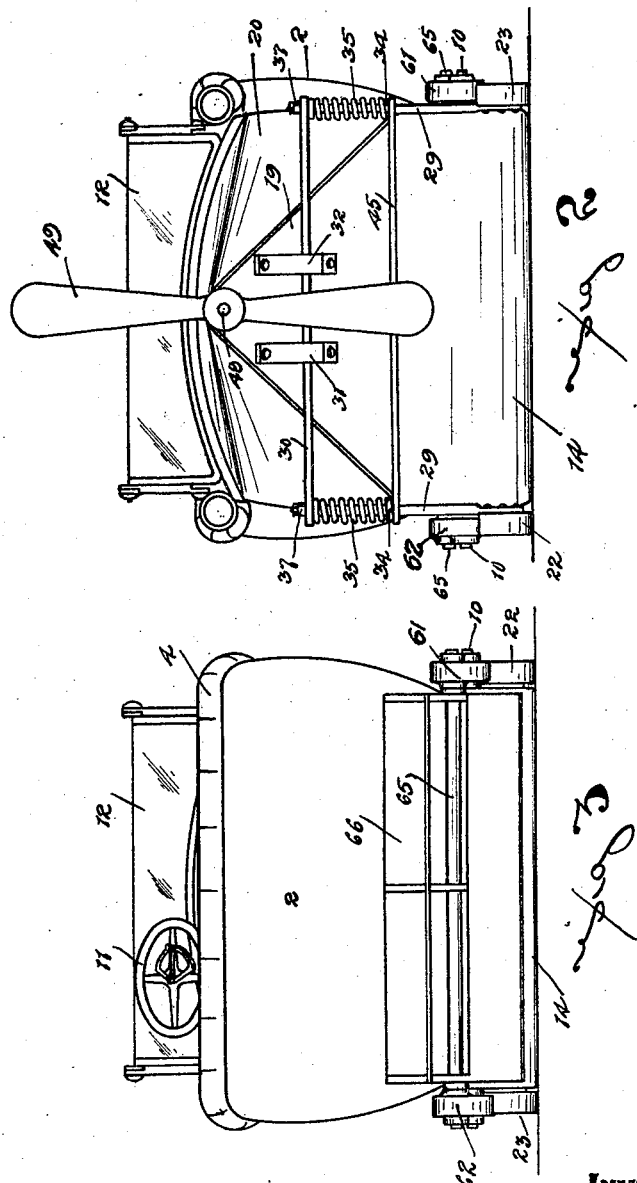

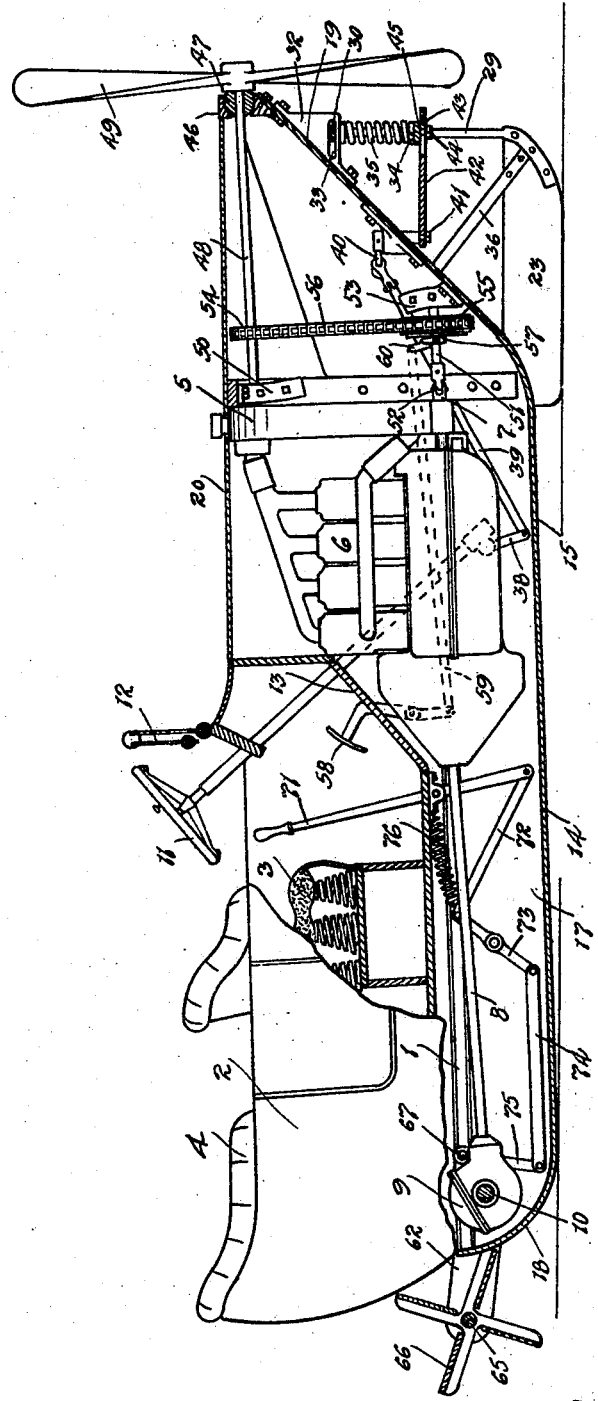

W. SIMON FRASER, OF MARIEAPOLIS, MANITOBA, CANADA.

AUTOMOBILE SLED.

1,415,165.  Specification of Letters Patent.  Patented May 9, 1922.

Application filed April 26, 1920. Serial No. 376,773.

*To all whom it may concern:*

Be it known that I, W. SIMON FRASER, of the town of Marieapolis, in the Province of Manitoba, Canada, have invented certain new and useful Improvements in Automobile Sleds, of which the following is the specification.

The invention relates to improvements in automobile sleds and the more important object of my invention is to provide an attachment to the existing automobile which will convert it into an efficient sled for city or country use, the invention being arranged so that it can be applied on the various well known types of automobiles.

A further object is to construct the appliance so that it can be readily steered and cannot become stalled through sinking in deep snow and in such a manner that there is practically no possibility of it side skidding.

A further object of the invention is to arrange the propellor so that the same can be adjusted to a favorable angle, depending on the circumstances met with and further to supply a rear paddle which can be utilized as an auxiliary drive in heavy places and can be used to hold back the sled when the same is going down hills.

With the above more important objects in view the invention consists essentially in the arrangement and construction of parts hereinafter more particularly described and later pointed out in the appended claims, reference being had to the accompanying drawings in which:—

Fig. 1 is a side view of the complete device.
Fig. 2 is a front view.
Fig. 3 is a rear view.
Fig. 4 is a sectional view through the appliance with certain parts of the automobile shown in side elevation.

In the drawings like characters of reference indicate corresponding parts in the several figures.

1 represents the chassis of an automobile, 2 the tonneau or body providing the seats 3 and 4, 5 the radiator and 6 the engine. 7 represents an engine shaft, the forward end of which projects beyond the radiator as is customary and the rear end of which connects with the transmission shaft 8 which enters the differential gear box 9 and is utilized to drive the rear drive shaft 10.

11 is a steering wheel, 12 the wind shield and 13 the pedal foot board. All the above parts are of ordinary construction and form no part of my invention.

In equipping the automobile with my invention I remove entirely the front axle, front wheels and steering gear, also the rear wheels and the engine hood. Having so dismantled the automobile I then proceed to apply my attachment.

14 is a metallic casing presenting a flat bottom 15, upstanding sides 16 and 17, an upwardly curving back end 18 and a forwardly extending and upwardly inclining half conical nose 19, the front end of which terminates in a location somewhat in advance of the centre of the radiator. This casing is suitably attached to the chassis of the automobile and takes a position directly underneath the same, the casing riding on the snow with the front end thereof elevated slightly as shown and the conical shaped nose positioned directly in advance of the radiator.

20 is a hood attached to the front end of the casing enclosing the engine and radiator and extending forwardly and enclosing the top side of the nose, the hood being also somewhat cone shaped to fit the nose at the sides. When this casing is attached the whole under part of the automobile is enclosed as is also the front end.

Suitable side openings are provided in the rear end of the casing to allow the ends of the rear axle to extend and the ends of the axle are each fitted with a chain wheel 21 for driving purposes as later disclosed.

The front end of the attachment is provided with a pair of steering runners 22 and 23 located to the side of the nose.

To the rear end of each runner I attach permanently a vertically disposed shaft 24 which is carried slidably in a pair of upper and lower brackets 25 and 26 permanently secured to the side of the nose. A collar 27 is permanently fastened to each shaft in a location directly above the bracket 26 and a coiled compression spring 28 is mounted on the shaft between the collar and the upper bracket. To the front end of each runner I attach permanently a vertically disposed front shaft 29 which extends upwardly and has the upper end passing slidably through the adjoining end of a cross bar 30 passing crosswise beneath the front end of the nose and carried by two side brackets 31 and 32 permanently secured to the nose.

Here it will be observed that the brackets are both fitted with horizontally disposed slots 33 to allow of the forward and back movement of the bar 30. A collar 34 is permanently secured to each of the front shafts and a spiral compression spring 35 is mounted on the front shaft between the bar and the collars.

From this arrangement it will be obvious that the weight of the automobile is carried by the toboggan like bottom of the casing which slide over the snow, the runners being merely used to steer and not to carry the weight of the machine as they will simply force themselves down into the loose snow at the side a distance depending on the spring pressure and the resistance of the snow.

The upper ends of the shafts are suitably braced to the runners by cross braces 36 and 37 extending between the upper ends of the shafts and the opposite ends of the runner, the braces being permanently connected both to the runner and the shafts. The steering of the runners is controlled from the hand wheel, the usual forwardly and backwardly turning crank 38 at the lower end of the steering post being connected through a connecting bar 39 with a crank 40 secured to the upper end of a short spindle 41 rotatably mounted in the nose.

The lower end of the spindle which projects underneath the nose is supplied with a forwardly extending lever 42 adapted to turn with the spindle and having the front end fitted with an elongated slot 43 which is fastened by means of a pin 44 to the underside of a cross bar 45 secured to the shafts 29.

Obviously when the hand wheel is turned the worm and worm wheel action at the lower end of the steering post will swing the lever 38 forwardly and backwardly and so effect the lateral swinging of the lever 42 and the consequent end shifting of the bar 45 which results in the turning in one direction or the other of the front ends of the runners.

In the forward end of the nose I provide a bearing 46 for a ball 47 through which I pass the propeller shaft 48, the propeller 49 being permanently secured to the front end of the shaft. The rear end of the propeller shaft terminates directly in advance of the radiator and is mounted for vertical adjustment in a carrier or hanger 50 secured to the hood. This arrangement is such that by adjusting and setting the position of the rear end of the shaft one can vary the angle of the propeller to suit requirements as by giving the propeller a considerable tilt one can have a raising or lifting action as well as a forward pulling action.

51 is a forwardly extending countershaft connected by a universal joint indicated at 52 to the forward end of the engine shaft. The front end of the countershaft is adjustably received within a guide 53 secured to the casing, the arrangement being such that one can adjust the front end of the counter shaft up and down and lock it in the adjusted position, the adjustment made complying with any adjustment which might be made in the propeller shaft.

The propeller and countershaft are both supplied with chain wheels 54 and 55 respectively connected by a chain 56. In order to control the driving of the propeller I associate a friction clutch with the chain wheel 54, the clutch being indicated generally by the reference character 57. A foot pedal 58 is located within convenient range of the driver on the front seat, the lower end of the foot pedal being connected through a suitably connected bar 59 with the clutch operating lever 60.

Obviously when one presses the pedal forwardly the bar 59 will pull back and throw the friction clutch in, which will result in the driving of the propeller shaft.

At the rear end of the casing I locate a paddle wheel which is utilized as an auxiliary drive when one meets with heavy roads and which is also used to hold back the sled when going down hill.

Two chain boxes 61 and 62 are pivotally swung from the ends of the rear axle, such enclosing the gears 21 and also the driving chains 63 mounted on the gear wheel 21 and driving chain wheels 64 secured to the ends of the paddle wheel shaft 65, the shaft being rotatably mounted in the sides of the chain box. Paddles 66 extend from the shaft. 67 is a cross shaft located in the rear end of the casing and provided at the ends with lifting arms 68, the rear extremities of which are fitted with pins 69 operating in suitable slots 70 provided in the chain boxes.

In a location directly in advance of the seat I locate a pivoted controlling lever 71 which is connected by means of a link 72 to the upper end of a rocker arm 73 located within the casing, the lower end of the rocker arm being connected by a link 74 with a lever 75 permanently secured to the shaft 67. The arrangement of these parts is such that when one pushes the lever away from the seat he swings the arm 68 downwardly and causes the paddles to engage the snow and the paddle wheel is normally held up by the action of a spiral spring 76 connected to the upper end of the rocker arm and normally pulling it ahead.

When the paddle wheel is to be used it will be understood that the rear axle of the car will be thrown into commission in the ordinary way to drive the chain wheels and as the said rear axle can be driven ahead or reversed it will be apparent that the paddle wheel can be rotated forwardly or backwardly as occasion may demand or thrown completely out of commission by disengaging the ordinary clutch pedal.

When an automobile is equipped with this attachment it will be seen that it can be readily steered from place to place and that under ordinary conditions the propeller would be sufficient for driving purposes. However, if heavy roads be encountered the paddle wheel could be used as auxiliary to the propeller and when going down hill one can prevent the sled from running away, so to speak, by driving the propeller backwardly to hold back the sled as required.

The arrangement of the casing is important as it not only protects all parts of the car but also presents a large bearing surface much in the nature of a full width skid or toboggan underneath the car which carries the car and prevents it positively from sinking.

What I claim as my invention is:—

1. The combination with an automobile body having the wheels thereof dismounted, of a flat bottomed casing located beneath and supporting the automobile body and having the front end thereof extending upwardly in advance of the automobile, steering runners located at the front end of the casing and a front propeller driven by the automobile engine.

2. The combination with an automobile body having the wheels thereof dismounted, of a flat bottomed casing located beneath and supporting the automobile body and having the front end thereof extending upwardly in advance of the automobile, downwardly spring pressed steering runners located at the front end of the casing and a front propeller driven by the automobile engine.

3. The combination with an automobile body having the wheels thereof dismounted, of a flat bottomed casing located beneath and supporting the automobile body and having the front end thereof extending upwardly in advance of the automobile, downwardly spring pressed steering runners located at the front end of the casing and an adjustable front propeller driven by the automobile engine.

4. The combination with an automobile body having the wheels thereof dismounted, of a flat bottomed casing located beneath the automobile body and having upturned sides attached to the body and a forwardly extending conical shaped front end extending beyond the front of the automobile body, an adjustable propeller shaft housed within the conical end of the casing, a driving connection between the automobile engine shaft and the propeller shaft and a propeller secured to the front end of the propeller shaft.

5. The combination with an automobile body having the wheels thereof dismounted, of a flat bottomed casing located beneath the automobile body and having upturned sides attached to the body and a forwardly extending conical shaped front end extending beyond the front of the automobile body, an adjustable propeller shaft housed within the conical end of the casing, a clutch controlled driving connection between the automobile engine shaft and the propeller shaft, a propeller secured to the front end of the propeller shaft and downwardly pressed steering runners located at the front of the casing.

6. The combination with an automobile body having the wheels thereof dismounted, of a flat bottomed casing located beneath the automobile body and having upturned sides attached to the body and a forwardly extending conical shaped front end extending beyond the front of the automobile body, a longitudinally disposed propeller shaft contained in the conical end of the casing, a pivotally mounted ball carrying the front end of the shaft, a vertically adjustable bearing carrying the rear end of the shaft, a countershaft having the rear end connected by a universal joint to the forward end of the automobile engine shaft and the forward end mounted in a vertically adjustable bearing, a clutch controlled driving connection between the countershaft and the propeller shaft and a propeller secured to the forward end of the propeller shaft.

7. The combination with an automobile body having the wheels thereof dismounted, of a flat bottomed casing located beneath the automobile body and having upturned sides attached to the body and a forwardly extending conical shaped front end extending beyond the front of the automobile body, a pair of vertically movable steering runners attached to the front end of the casing and springs normally pressing the runners downwardly.

8. The combination with an automobile body having the wheels thereof dismounted, of a flat bottom casing located beneath the automobile body and having upturned sides attached to the body and a forwardly extending conical shaped front end extending beyond the front of the automobile body, a pair of forwardly located steering runners, vertical front and rear shafts secured to the runners, a pair of upper and lower brackets permanently secured to the sides of the casing and receiving the rear runner shafts, springs associated with the rear shafts and normally pressing the runners downwardly, a cross bar carried by the conical end of the casing and slidably receiving the upper ends of the front runner shafts, springs associated with the front shafts and normally pressing the front ends of the runners downwardly, a second bar connecting the front runner shafts and steering means connected with the latter bar and controlled from the automobile seat.

9. The combination with an automobile body having the wheels thereof dismounted, of a flat bottomed casing located beneath the automobile body and having upturned sides attached to the body and a forwardly extending conical shaped front end extending beyond the front of the automobile body, a rotatably mounted paddle wheel located at the rear end of the casing and swung from the rear axle of the automobile and a driving connection between the paddle wheel and the rear axle.

10. The combination with an automobile body having the wheels thereof dismounted, of a flat bottomed casing located beneath the automobile body and having upturned sides attached to the body and a forwardly extending conical shaped front end extending beyond the front of the automobile body, a paddle wheel located to the rear of the casing, chain boxes pivotally swung from the rear axle of the automobile and pivotally carrying the paddle wheel and driving chains contained within the boxes and connecting the rear axle with the paddle wheel.

11. The combination with an automobile body having the wheels thereof dismounted, of a flat bottomed casing located beneath the automobile body and having upturned sides attached to the body and a forwardly extending conical shaped front end extending beyond the front of the automobile body, a paddle wheel located to the rear of the casing, chain boxes pivotally swung from the rear axle of the automobile and pivotally carrying the paddle wheel, driving chains contained within the boxes and connecting the rear axle with the paddle wheel, spring means for normally maintaining the paddle wheel in an up position and means actuated from the driving seat of the automobile for swinging the paddle wheel downwardly against the action of the spring.

Signed at Winnipeg, this 22 day of March, 1920.

W. SIMON FRASER.

In the presence of—
GERALD S. ROXBURGH,
K. B. WAKEFIELD.